(12) United States Patent
He et al.

(10) Patent No.: US 9,149,725 B2
(45) Date of Patent: Oct. 6, 2015

(54) METHOD AND SERVER FOR PVP TEAM MATCHING IN COMPUTER GAMES

(71) Applicant: TENCENT TECHNOLOGY (SHENZHEN) COMPANY LIMITED, Shenzhen (CN)

(72) Inventors: Kun He, Shenzhen (CN); Zhu Mao, Shenzhen (CN); Rui Luo, Shenzhen (CN); Ke Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/278,178

(22) Filed: May 15, 2014

(65) Prior Publication Data

US 2014/0357374 A1    Dec. 4, 2014

Related U.S. Application Data

(63) Continuation of application No. PCT/CN2014/072145, filed on Feb. 17, 2014.

(30) Foreign Application Priority Data

Jun. 3, 2013    (CN) .................. 2013 1 02165004

(51) Int. Cl.
*A63F 13/12*    (2006.01)
*A63F 13/795*   (2014.01)
*A63F 13/48*    (2014.01)
*A63F 13/30*    (2014.01)

(52) U.S. Cl.
CPC .............. *A63F 13/795* (2014.09); *A63F 13/30* (2014.09); *A63F 13/48* (2014.09)

(58) Field of Classification Search
USPC ........................................... 463/42
See application file for complete search history.

(56) References Cited

U.S. PATENT DOCUMENTS 8,926,430 B1 *   1/2015   Ikeda et al. .................. 463/31

FOREIGN PATENT DOCUMENTS

CN   101030235 A   9/2007
CN   102346805 A   2/2012

OTHER PUBLICATIONS

The State Intellectual Property Office of the People's Republic of China (SIPO) Office Action 1 for 2013-10216500.4 Feb. 17, 2015.

* cited by examiner

*Primary Examiner* — Pierre E Elisca
(74) *Attorney, Agent, or Firm* — Anova Law Group, PLLC (57) ABSTRACT

A computer-implemented method for team battle matching in a computer game is provided. The method includes obtaining registration information and player number information for teams to participate in a team battle having two battle camps and creating a plurality of matching queues. The method also includes allocating teams having equal number of players to a same matching queue based on the player number information and selecting one team from a matching queue allocated with one or more teams having the maximum number of players. Further, the method includes determining whether a total number of players in the selected team is equal to a preset number and allocating the team to a battle camp when the total number of players of the selected team is equal to the preset number.

6 Claims, 6 Drawing Sheets

METHOD AND SERVER FOR PVP TEAM MATCHING IN COMPUTER GAMES

CROSS-REFERENCES TO RELATED APPLICATIONS

This application is a continuation application of PCT Patent Application No. PCT/CN2014/072145, filed on Feb. 17, 2014, which claims priority of Chinese Patent Application No. 201310216500.4, filed on Jun. 3, 2013, the entire contents of which are incorporated by reference herein.

FIELD OF THE INVENTION

The present invention generally relates to the Internet and video game technologies and, more particularly, to methods and servers for team battle matching.

BACKGROUND

With continuous development of the Internet, online games are increasingly being accepted by people. In the current online games, player(s) versus player(s) (PVP, a battle mode) is a popular play mode. In the PVP battle mode, the server selects a certain number of teams for two battle camps from multiple teams, making a total number of players of the two battle camps to meet quantity requirements.

Currently, when matching teams for a team battle, at the beginning, all teams are arranged in an order in a queue. Then, according to the order of the teams in the queue, the appropriate number of teams is selected for two battle camps, making the total number of players of two camps to meet quantity requirements. However, a false matching rate is relatively high in the existing team battle matching method. For example, according to order of registration, if the number of players of 6 teams is 4, 3, 1, 4, 3, and 2, respectively, when a current team battle matching is 8 vs. 8, according to the existing team battle matching method, a composition of players of one camp that meets quantity requirements is 4, 3 and 1. At this time, a composition of players of the other camp is 4, 3 and 2, which the number is more than 8 players, resulting in a matching failure.

The disclosed method and server are directed to solve one or more problems set forth above and other problems.

BRIEF SUMMARY OF THE DISCLOSURE

One aspect of the present disclosure includes a computer-implemented method for team battle matching in a computer game. The method includes obtaining registration information and player number information for teams to participate in a team battle having two battle camps and creating a plurality of matching queues. The method also includes allocating teams having equal number of players to a same matching queue based on the player number information and selecting one team from a matching queue allocated with one or more teams having the maximum number of players. Further, the method includes determining whether a total number of players in the selected team is equal to a preset number and allocating the team to a battle camp when the total number of players of the selected team is equal to the preset number.

Another aspect of the present disclosure includes a server for team battle matching. The server includes an allocation unit configured to, for teams to participate in a team battle, allocate teams having equal of players to a same matching queue. The server also includes a selection unit configured to select one team from the matching queue allocated with one or more teams having the maximum number of players through the allocation unit. Further, the server includes a determination unit configured to determine whether a total number of players in the selected team by the selection unit is equal to a preset number and the allocation unit also configured to allocate the team to a battle camp when the determination unit determines that the total number of players of the selected team is equal to the preset number.

Another aspect of the present disclosure includes a computer gaming system. The computer gaming system includes a plurality of terminals and a server coupled to the plurality of terminals for team battle matching. The plurality of terminals provides teams to participate in a team battle. The server is configured to allocate teams having equal of players to a same matching queue; to select one team from the matching queue allocated with one or more teams having the maximum number of players through the allocation unit; to determine whether a total number of players in the selected team by the selection unit is equal to a preset number; and, when it is determined that the total number of players of the selected team is equal to the preset number, to allocate the team to a battle camp.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present disclosure, the figures which are needed to be used in the description of the present disclosure or the existing technology are briefly described in the following. Obviously, the figures in the following description are only some embodiments of the present disclosure, and it is easily for those skilled in the art to obtain other figures based on the following figures without creative work.

DETAILED DESCRIPTION

Reference will now be made in detail to exemplary embodiments of the disclosure, which are illustrated in the accompanying drawings.

Figure 12:
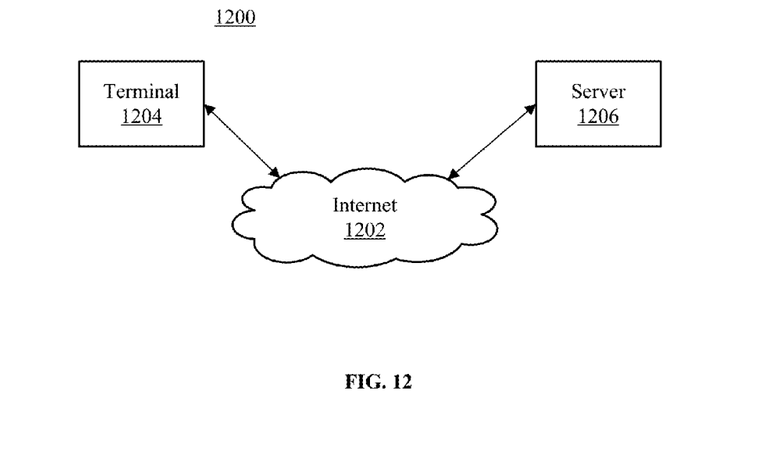
FIG. 12 shows an environment incorporating certain aspects of the present invention.

FIG. 12 shows an environment incorporating certain aspects of the present invention. As shown in FIG. 12, environment 1200 may include a terminal 1204, a server 1206, and the Internet 1202. The terminal 1204 may access the server 1206 through the Internet 1202 for certain personalized services provided by the server 1206. Although only one server 1206 and one terminal 1204 is shown in the environment 1200, any number of terminals 1204 or servers 1206 may be included, and other devices may also be included.

The Internet 1202 may include any appropriate type of communication network for providing network connections to the terminal 1204 and server 1206 or among multiple terminals 1204 and servers 1206. For example, Internet 1202 may include the Internet or other types of computer networks or telecommunication networks, either wired or wireless.

A terminal, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 1204 may be a wireless terminal, such as a smart phone, a tablet computer, or a mobile phone, etc. Terminal 1204 may be implemented on any appropriate computing platform. For example, the terminal 1204 may run a browser or a gaming software program to play a computer game online with other players/terminals.

A server, as used herein, may refer one or more server computers configured to provide certain web server functionalities to provide certain team battle matching services. A server may also include one or more processors to execute computer programs in parallel.

Figure 13:
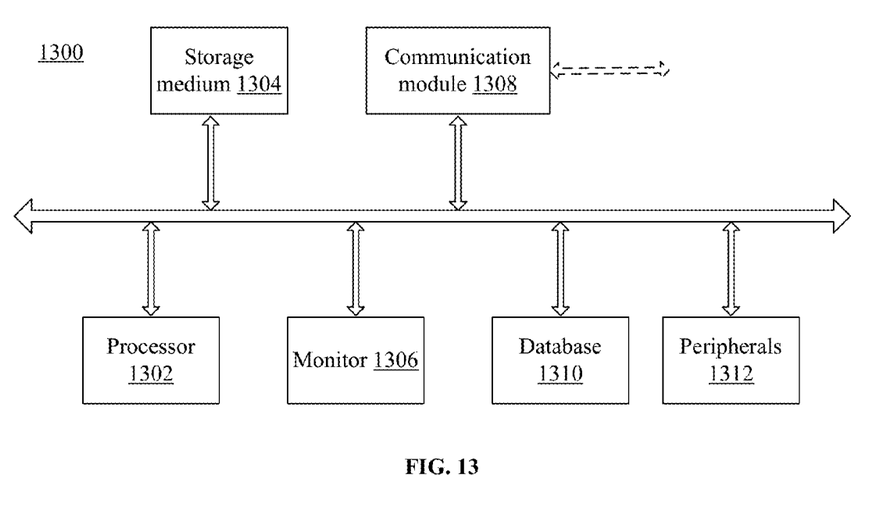
FIG. 13 shows a block diagram of an exemplary computer system 1300 capable of implementing the system for team battle matching.

FIG. 13 shows a block diagram of an exemplary computer system 1300 capable of implementing the system for team battle matching (e.g., terminal, server, etc.).

As shown in FIG. 13, computer system 1300 may include a processor 1302, a storage medium 1304, a monitor 1306, a communication module 1308, a database 1310, and peripherals 1312. Certain devices may be omitted and other devices may be included.

Processor 1302 may include any appropriate processor or processors. Further, processor 1302 can include multiple cores for multi-thread or parallel processing. Storage medium 1304 may include memory modules, such as ROM, RAM, flash memory modules, and erasable and rewritable memory, and mass storages, such as CD-ROM, U-disk, and hard disk, etc. Storage medium 1304 may store computer programs for implementing various processes, when executed by processor 1302.

Further, peripherals 1312 may include I/O devices such as keyboard and mouse, and communication module 1308 may include network devices for establishing connections through the communication network. Database 1310 may include one or more databases for storing certain data and for performing certain operations on the stored data, such as database searching.

Figure 1:
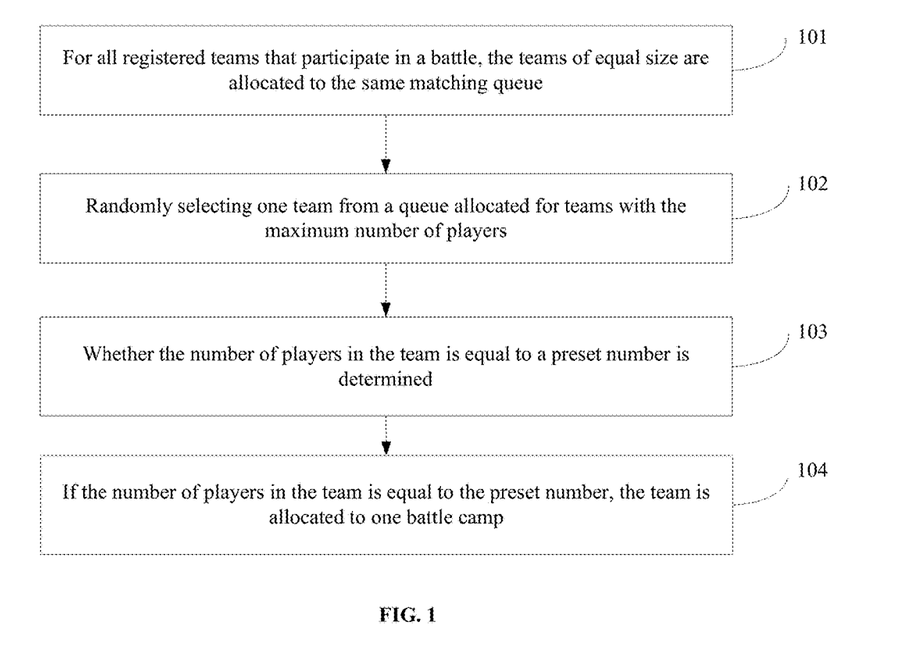
FIG. 1 illustrates a flow chart of an exemplary team battle matching process consistent with the disclosed embodiments.

In operation, terminal 1204 and/or server 1206 may implement a PVP team battle matching process to perform certain functions for team battle matching. FIG. 1 illustrates a flow chart of an exemplary process for team battle matching consistent with the disclosed embodiments. As shown in FIG. 1, the process may include the following steps.

Step 101: for all registered teams that participate in a battle, the teams of equal size are allocated to the same matching queue.

PVP is a type of multiplayer interactive conflict within a game between two or more live participants. The term 'team' refers to a participating group of players. The number of players in the registered teams that participate in the battle can be 1, 2, 4, etc. There is no limitation for the number of players in the teams in the present embodiment. For example, four teams are registered to participate in the battle. The number of players of team 1, team 2, team 3, and team 4 are 4, 3, 2 and 2, respectively.

Further, one or more matching queues are created for team battle matching, and each matching queue may contain one or more teams of equal size. In the above example, the four teams may be assigned into three matching queues, where queue 1 is allocated with team 1 (4 players); queue 2 is allocated with team 2 (3 players); and queue 3 is allocated with team 3 and team 4 (both with 2 players).

Step 102: randomly selecting one team from a queue allocated for teams with the maximum number of players.

For another example, if there are total three queues, Queue 1 is allocated with team 1 with 4 players and team 2 with 4 players; Queue 2 is allocated with team 3 with 3 players; and Queue 3 is allocated with team 4 with 2 players. At this time, a team is selected from the queue allocated with the maximum number of teams, which may be team 1 or team 2 in Queue 1.

Step 103: whether the number of players in the team is equal to a preset number is determined.

The preset number is the number of players required for each battle camp in a battle mode. For example, the preset number is 8 in an 8 vs.8 mode; and the preset number is 16 in a 16 vs.16 mode. The number of players of the team selected may then be obtained and compared with the preset number to determine whether the number of players of the selected team is equal to the preset number.

Step 104: if the number of players in the team is equal to the preset number, the team is allocated to one battle camp.

For example, if the current battle is an 8 vs.8 mode, and if it is determined that the number of players of the selected team is 8, the selected team may be allocated as one camp in the 8 vs.8 mode, and the other camp is selected from the remainder teams according to the above described steps.

Thus, a team battle matching method is provided. For teams that participate in a battle, the teams of equal size are allocated to the same queue. Then, any one team is selected from the queue allocated with the teams with the maximum number of players. Further, whether the number of players in the team is equal to a preset number is determined. If the number of players in the team is equal to the preset number, the team is allocated to one battle camp. Compared with the existing methods, the method can reduce a false matching rate and improve efficiency of team battle matching.

Figure 2:
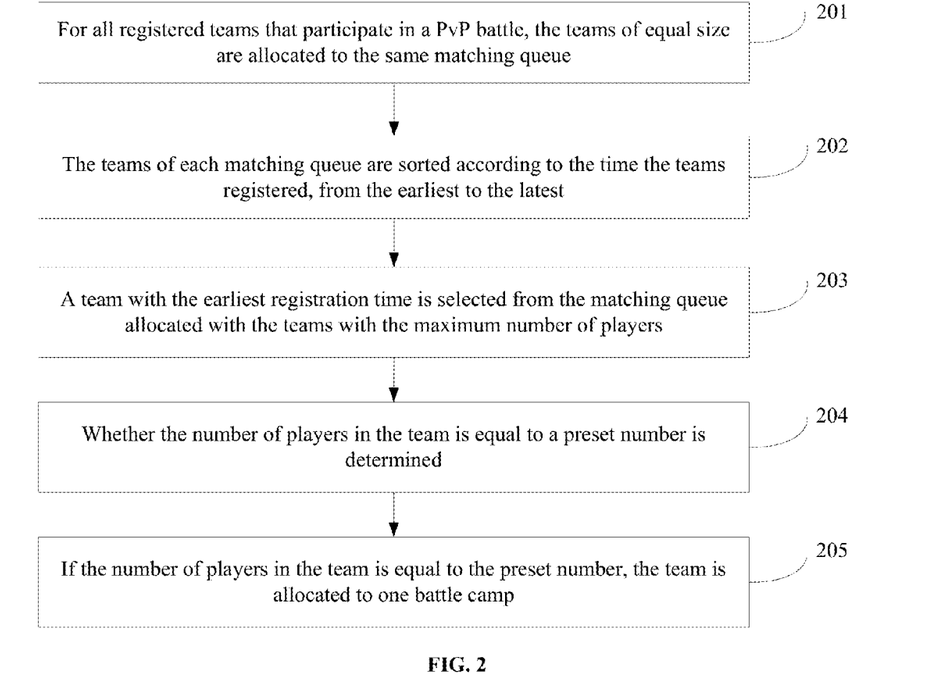
FIG. 2 illustrates a flow chart of another exemplary team battle matching process consistent with the disclosed embodiments.

FIG. 2 illustrates a flow chart of another exemplary process of team battle matching consistent with the disclosed embodiments. As shown in FIG. 2, the process may include the following steps.

Step 201: for all registered teams that participate in a PVP battle, the teams of equal size are allocated to the same matching queue.

The number of players in the registered teams that participate in the PVP battle can be any number, such as 4, 8, 9, etc. Further, one or more matching queues are created for team battle matching, and each matching queue may contain one or more teams of equal size.

For example, 6 teams are registered to participate in the battle. The number of players of team 1, team 2, team 3, team 4, team 5 and team 6 are 8, 8, 8, 4, 3, and 3, respectively. All the teams are divided into three matching queues, where queue 1 is allocated with team 1, team 2, and team 3; queue 2 is allocated with team 4; queue 3 is allocated with team 5 and team 6.

Step 202: the teams of each matching queue are sorted according to the time the teams registered, from the earliest to the latest.

For example, if there are 3 teams in a matching queue, including team 1, team 2, and team 3, when the order of registration of the three teams is team 3, team 1, and team 2, a sort order of the three teams is team 3, team 1, and team 2 in the matching queue.

Step 203: a team with the earliest registration time is selected from the matching queue allocated with the teams with the maximum number of players.

The earliest registration team is given priority for the battle matching by selecting the team with the earliest registration time, further enhancing the user experience.

Step 204: whether the number of players in the team is equal to a preset number is determined.

Step 205: if the number of players in the team is equal to the preset number, the team is allocated to one battle camp.

Alternatively, in Step 205, if the number of players in the team is less than the preset number, again, a matching queue with the teams with the maximum number of players is selected from the matching queues including unselected teams. Then, a team is selected from the matching queue allocated with the teams with the maximum number of players. A total number of players in all selected teams is then obtained. If the total number of players in the selected teams is equal to the preset number, the selected teams are allocated to the same battle camp.

Also, when selecting the team from the matching queue allocated with the teams with the maximum number of players, the earliest registration team may be given priority for the team battle matching, i.e., selecting the team with the earliest registration order again may be selected, further enhancing the user experience.

Further, if the number of players in the selected team or teams is greater than the preset number, the last selected team is unselected from (or reallocated to) the corresponding matching queue. Then, from the matching queues including the teams with the number of players less than the number of players of the last selected team, a matching queue with the teams with the maximum number of players is selected. A team is then selected from the selected matching queue allocated with the teams with the maximum number of players. A total number of players in the selected teams is obtained. If the number of players in the selected teams is equal to the preset number, the selected teams are allocated to one battle camp.

Further, after the team is selected from the selected matching queue allocated with the teams with the maximum number of players, if the number of players in the selected teams is still greater than the preset number, the last selected team is unselected from (or reallocated to) the corresponding matching queue, and the second-to-last selected team is also unselected from (or reallocated to) the corresponding matching queue. Then, from the matching queues with the teams with the number of players less than the number of players in the second-to-last selected team, the matching queue with the maximum number of players of the teams is selected. A team is then selected from the matching queue allocated with the teams with the maximum number of the players. A total number of players in the selected teams is again obtained. If the number of players in the selected teams is equal to the preset number, the selected teams are allocated to one battle camp. Thus, the success rate of the team battle matching can be further improved by the backing up selection.

Optionally, after obtaining the total number of players in the various selected teams, an accumulated number of times for obtaining the total number of players in the various selected teams is recorded. If the accumulated number of times is greater than or equal to a preset threshold, team battle matching process is terminated and the registered teams that participate in the team battle are updated. For example, the registered teams may be notified that team battle matching is failed, and the one or more team may request another team battle matching when new team(s) registered for the team battle.

Thus, the problem that the teams cannot be successfully matched over a long time period can be avoided by setting the preset threshold of the accumulated number of times for obtaining the total number of players, and the server may adjust team matching method in time, improving the matching efficiency of PVP team battle.

For example, the preset threshold of the accumulated number of times for obtaining the total number of players may be 200. Because each time for obtaining the number of players may cost probably 0.01 ms, if the accumulated number of times for obtaining the total number of players is greater than 200, the total length of matching time is more than 2 ms. At this time, matching efficiency is relatively low. Therefore, the accumulated number of times for obtaining the total number of players can be set to 200 to ensure a high efficiency of team battle matching.

Figure 5:
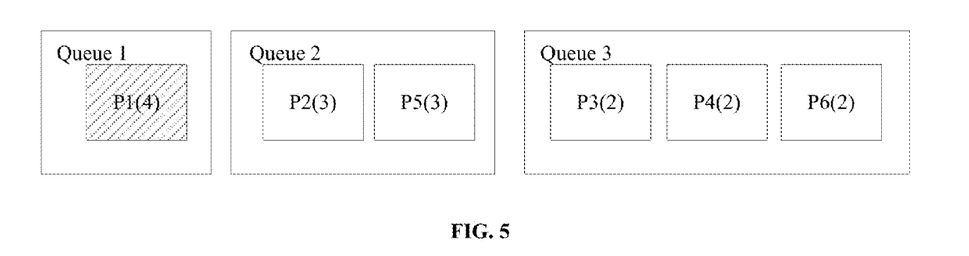
FIG. 5 illustrates a schematic diagram 1 of an exemplary team battle matching consistent with the disclosed embodiments.

Specifically, an application scenario can be shown below for illustrative purposes. A server obtains registration information for 6 teams registered to participate in an 8 vs. 8 PVP battle mode. The order of registration of the teams is P1(4), P2(3), P3(2), P4(2), P5(3), and P6(2), where 'i' in Pi(x) indicates the team number, and x is the number of players in each team. FIG. 5 illustrates a schematic diagram 1 of an exemplary team battle matching consistent with the disclosed embodiments.

As shown in FIG. 5, at the beginning, according to the number of players in each team, the server allocates P1(4) to queue 1; the server allocates P2(3) and P5(3) to queue 2; the server allocates P3(2), P4(2) and P6(2) to queue 3. Further, the team P1(4) is selected from the queue allocated with the teams with the maximum number of players.

Figure 6:
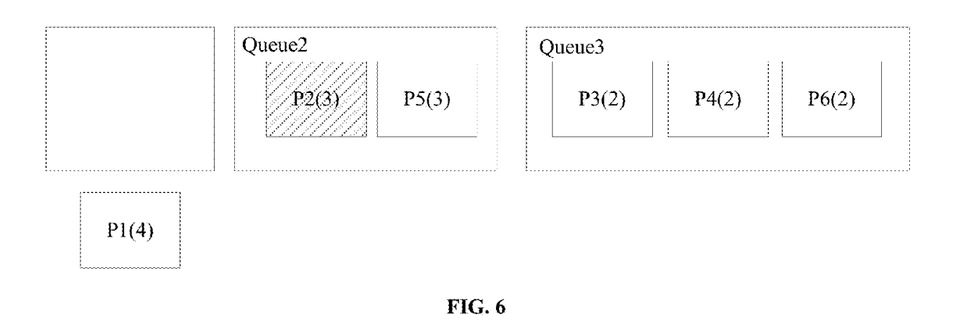
FIG. 6 illustrates a schematic diagram 2 of an exemplary team battle matching consistent with the disclosed embodiments.

FIG. 6 illustrates a schematic diagram 2 of an exemplary team battle matching consistent with the disclosed embodiments. As shown in FIG. 6, when it is determined that the number of players in P1(4) is less than 8, and currently, the queue with the teams with the maximum number of players is queue 2, P2(3) with the earliest registration time is selected from queue 2.

Figure 7:
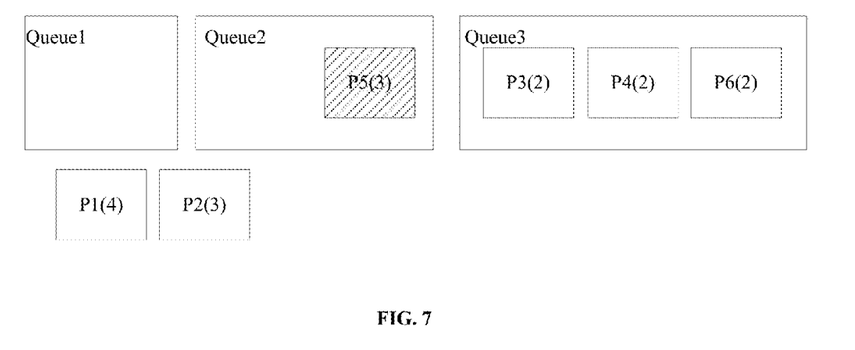
FIG. 7 illustrates a schematic diagram 3 of an exemplary team battle matching consistent with the disclosed embodiments.

FIG. 7 illustrates a schematic diagram 3 of an exemplary team battle matching consistent with the disclosed embodiments. As shown in FIG. 7, a total number players of the selected P1(4) and P2(3) is 7. At this time, it is determined that the total number of players is less than 8, and the queue with the teams with the maximum number of players is queue 2 among the queues including unselected teams. P5(3) is then selected from the queue 2.

Figure 8:
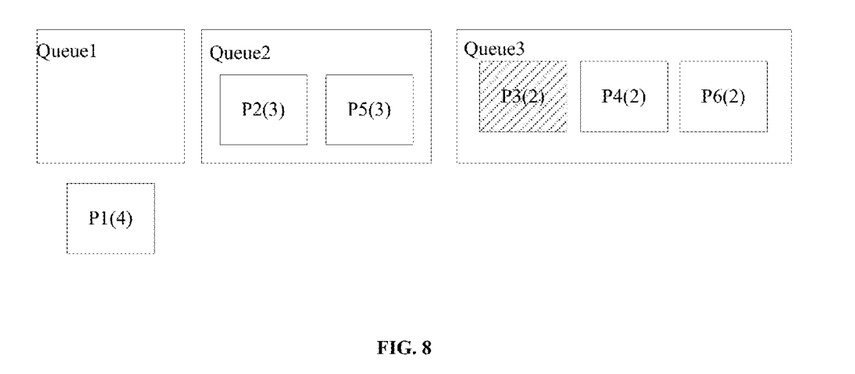
FIG. 8 illustrates a schematic diagram 4 of an exemplary team battle matching consistent with the disclosed embodiments.

FIG. 8 illustrates a schematic diagram 4 of an exemplary team battle matching consistent with the disclosed embodiments. As shown in FIG. 8, at this time, the total number of players is 10 and it is greater than 8. The server replaces P5(3) by any one team in queue 3. The total number of players is still greater than 8. At this time, the server reallocates back the last selected team to queue 3; the server reallocates back the second-to-last selected team P2(3) to queue 2. Then, P3(2) is selected from queue 3. The number of players in the teams of queue 3 is less than the number of players in the teams of queue 2.

Figure 9:
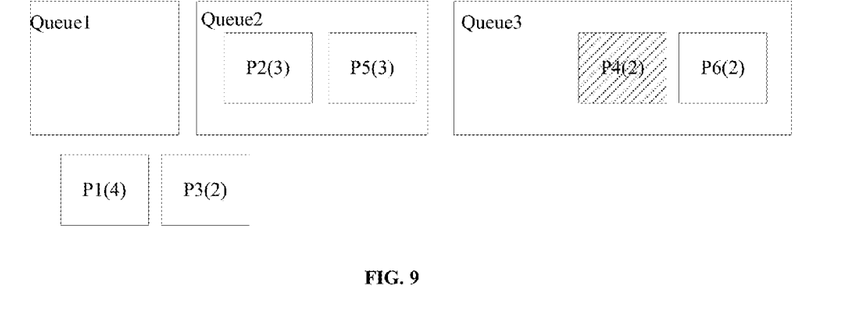
FIG. 9 illustrates a schematic diagram 5 of an exemplary team battle matching consistent with the disclosed embodiments.

FIG. 9 illustrates a schematic diagram 5 of an example team battle matching consistent with the disclosed embodiments. As shown in FIG. 9, the total number of players in the selected teams is 6 and it is less than 8. Therefore, the server continues to select P4(2) from queue 3.

Figure 10:
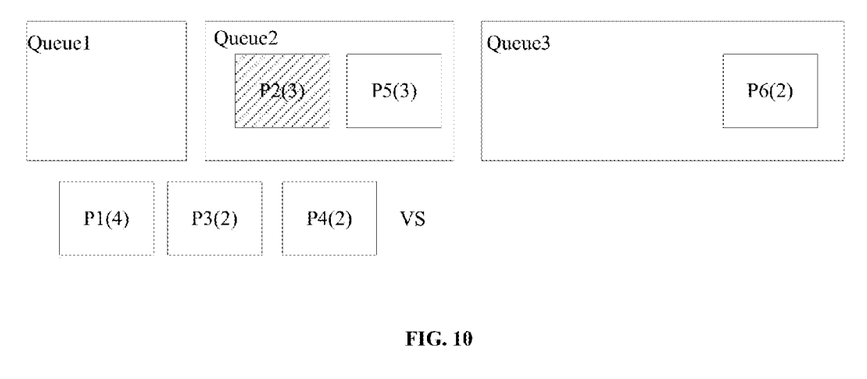
FIG. 10 illustrates a schematic diagram 6 of an exemplary team battle matching consistent with the disclosed embodiments.

FIG. 10 illustrates a schematic diagram 6 of an exemplary team battle matching consistent with the disclosed embodiments. As shown in FIG. 10, the total number of players in the selected teams is 8 and it meets the requirement. P1(4), P3(2) and P4(2) are formed into one battle camp. Similarly, the teams are selected from the remaining P2 (3), P5 (3) and P6 (2) to form the other battle camp.

Figure 11:
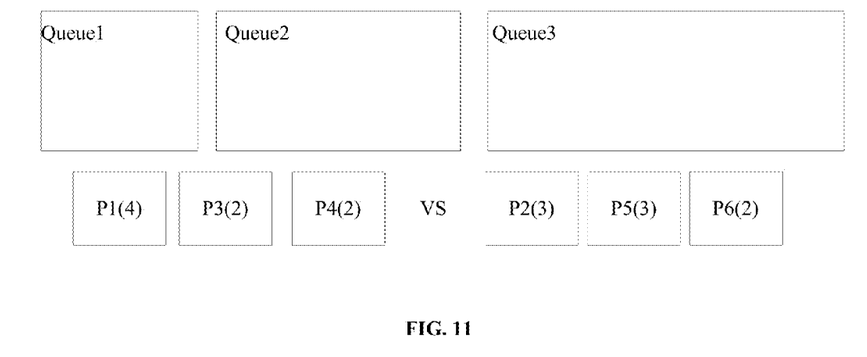
FIG. 11 illustrates a schematic diagram 7 of an exemplary team battle matching consistent with the disclosed embodiments.

Thus, after repeating the selection steps, the entire battle team matching process is completed. FIG. 11 illustrates a schematic diagram 7 of an exemplary team battle matching consistent with the disclosed embodiments. The final matching result is shown in FIG. 11. That is, one battle camp is P1(4), P3(2) and P4(2), and the other battle camp is P2 (3), P5(3) and P6(2).

Thus, the disclosed embodiments provide a method for team battle matching. For registered teams that participate in a battle, the teams of equal size are allocated to the same queue. Then, the teams of each queue are sorted according to the time the teams registered, from the earliest to the latest. A team with the earliest registration is selected from the queue allocated with the teams with the maximum number of players. Further, whether the number of players in the team is equal to a preset number is determined. If the number of players of the team is equal to the preset number, the team is allocated to one battle camp. Compared with the existing methods, the method can reduce a false matching rate and improve efficiency of team battle match.

Figure 3:
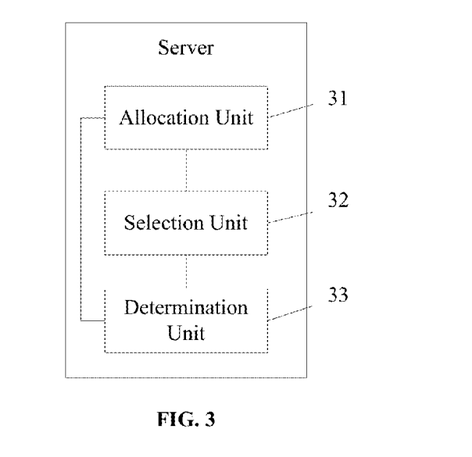
FIG. 3 illustrates a structure diagram of an exemplary server for team battle matching consistent with the disclosed embodiments.

FIG. 3 illustrates a structure diagram of an exemplary server for team battle matching consistent with the disclosed embodiments. As shown in FIG. 3, the server may include an allocation unit 31, a selection unit 32, and a determination unit 33.

The allocation unit 31 is configured to, for teams to participate in a team battle, allocate teams having equal of players to a same matching queue.

The selection unit 32 is configured to select one team from the matching queue allocated with one or more teams having the maximum number of players through the allocation unit 31.

The determination unit 33 is configured to determine whether a total number of players in the selected team by the selection unit 32 is equal to a preset number.

The allocation unit 31 is also configured to, when the determination unit 33 determines that the total number of players of the selected team is equal to the preset number, allocate the team to a battle camp.

Figure 4:
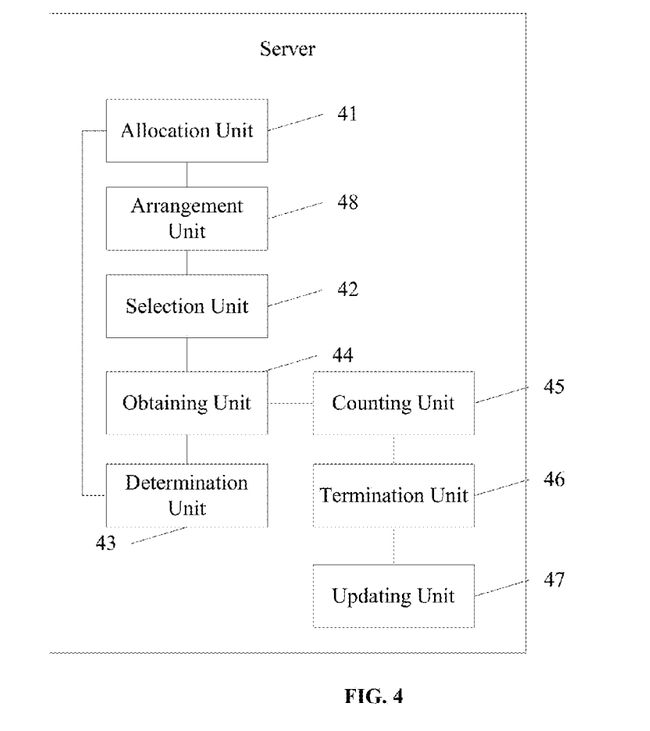
FIG. 4 illustrates a structure diagram of another exemplary server of team battle matching consistent with the disclosed embodiments.

FIG. 4 illustrates a structure diagram of another exemplary server for team battle matching consistent with the disclosed embodiments. As shown in FIG. 4, the server may include an allocation unit 41, a selection unit 42, a determination unit 43, an obtaining unit 44, a counting unit 45, a termination unit 46, an updating unit 47 and an arrangement unit 48.

The allocation unit 41 is configured to, for teams to participate in a team battle, allocate teams having equal of players to a same matching queue.

The selection unit 42 is configured to select one team from the matching queue allocated with one or more teams having the maximum number of players through the allocation unit 41.

The determination unit 43 is configured to determine whether a total number of players in the selected team by the selection unit 42 is equal to a preset number.

The allocation unit 41 is also configured to, when the determination unit 43 determines that the total number of players of the selected team is equal to the preset number, allocate the team to a battle camp.

The selection unit 42 is also configured to, when the determination unit determines that the number of players of the team is less than the preset number, select a matching queue with one or more teams having a maximum number of players from the matching queues including one or more unselected teams.

The selection unit 42 is also configured to select one team from the matching queue allocated with the teams with the maximum number of players selected from the matching queues with the teams with the number of players less than the number of players in the last selected team.

The obtaining unit 44 is configured to obtain a total number of players in all selected teams. The allocation unit 41 is also configured to, when the total number of players in all selected teams is equal to the preset number, allocate all selected teams to the same battle camp.

The allocation unit 41 is also configured to, when the number of players in the selected team is greater than the preset number reallocate the last selected team to the corresponding queue.

The selection unit 42 is also configured to, from the matching queues with the teams with the number of players less than the number of players in the last selected team, select a matching queue with the team with a maximum number of players. The selection unit 42 is also configured to select any one team from the matching queue allocated with the teams with the maximum number of players.

The obtaining unit 44 is configured to obtain the total number of players in all selected teams. The allocation unit 41 is also configured to, when the total number of players in all selected teams is equal to the preset number, allocate all selected teams to the same battle camp.

The allocation unit 41 is also configured to, when one team is selected from the selected matching queue allocated with the teams with the maximum number of players and the total number of players in all selected teams is still greater than the preset number, reallocate a last selected team to its corresponding matching queue and reallocate a second-to-last selected team to the corresponding matching queue.

The selection unit 42 is also configured to, from the matching queues with one or more teams with the number of players less than the number of players in the second-to-last selected team, select a matching queue with one or more teams with the maximum number of players.

The selection unit 42 is also configured to select one team from the matching queue allocated with the teams with the maximum number of players selected from the matching queues with one or more teams with the number of players less than the number of players in the second-to-last selected team.

The obtaining unit 44 is also configured to obtain a total number of players in all selected teams. The allocation unit 41 is also configured to, when the total number of players in all selected teams is equal to the preset number, allocate all selected teams to the same battle camp. The counting unit 45 is configured to record an accumulated number of times for obtaining the total number of players in all selected teams.

The termination unit 46 is configured to, when the accumulated number of times is greater than or equal to a preset threshold, terminate the method for team battle matching. The updating unit 47 is configured to update the registered teams that participate in the team battle.

The arrangement unit 48 is configured to sort the teams of each queue according to the time the teams registered, from the earliest to the latest. The selection unit 42 is also configured to, when selecting a team from each queue, selecting a team with an earliest registration from the queue.

For teams to participate in a team battle, teams having equal of players are allocated to a same matching queue. Then, any one team is selected from the queue allocated with the teams having the maximum number of players. Further, whether the number of players in the team is equal to a preset number is determined. If the number of players in the team is equal to the preset number, the team is allocated to one battle camp. Compared with the existing methods, the method can reduce a false matching rate and improve efficiency of team battle matching.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed method and server for team battle matching, for teams to participate in a team battle, teams having equal of players are allocated to a same matching queue. Then, any one team is selected from the queue allocated with the teams having the maximum number of players. Further, whether the number of players in the team is equal to a preset number is determined. If the number of players in the team is equal to the preset number, the team is allocated to one battle camp. Compared with the existing methods, the method can reduce a false matching rate and improve efficiency of team battle matching.

What is claimed is:

1. A computer gaming system, comprising:
a plurality of terminals; and
a server coupled to the plurality of terminals for team battle matching, wherein
the plurality of terminals provides a plurality of teams to participate in a team battle; and
the server is configured to:
initiate a multiplayer interactive online game between two or more players in the plurality of teams to be organized into at least two battle camps, each team having one or more players and each battle camp having one or more of the plurality of teams;
obtain registration information and player number information for each of the plurality of teams;
create a plurality of matching queues, wherein a total number of the matching queues is greater than or equal to three;
based on the player number information, allocate teams having equal number of players to a same matching queue and allocate remaining teams into remaining matching queues, based on the registration information;
start a selection process to select one or more teams from the plurality of matching queues into the battle camps such that each battle camp has a same preset number of players, including
selecting one team from the matching queue allocated with one or more teams having the maximum number of players;
determining whether a total number of players in the selected team is equal to a preset number; and
when the total number of players of the selected team is equal to the preset number, allocating the team to a battle camp; and
start the multiplayer interactive online game with the battle camps having the same preset number of players.

2. The computer gaming system according to claim 1, wherein the server is further configured to:
when the number of players of the team is less than the preset number, select a matching queue with one or more teams having a maximum number of players from the matching queues including one or more unselected teams;
select one team from the matching queue allocated with the teams with the maximum number of players selected from the matching queues including one or more unselected teams;
obtain a total number of players in all selected teams; and
when the total number of players in all selected teams is equal to the preset number, allocate all selected teams to the same battle camp.

3. The computer gaming system according to claim 2, wherein the server is further configured to:
when the number of players in the selected teams is greater than the preset number, reallocate the last selected team to the corresponding queue;
from the matching queues with the teams with the number of players less than the number of players in the last selected team, select a matching queue with the teams with a maximum number of players;
select one team from the matching queue allocated with the teams with the maximum number of players selected from the matching queues with the teams with the number of players less than the number of players in the last selected team;
obtain the total number of players in all selected teams; and
when the total number of players in all selected teams is equal to the preset number, allocate all selected teams to the same battle camp.

4. The computer gaming system according to claim 3, wherein the server is further configured to:
when one team is selected from the selected matching queue allocated with the teams with the maximum number of players and the total number of players in all selected teams is still greater than the preset number, reallocate a last selected team to its corresponding matching queue and reallocate a second-to-last selected team to the corresponding matching queue;

from the matching queues with one or more teams with the number of players less than the number of players in the second-to-last selected team, select a matching queue with one or more teams with the maximum number of players;

select one team from the matching queue allocated with the teams with the maximum number of players selected from the matching queues with one or more teams with the number of players less than the number of players in the second-to-last selected team;

obtain a total number of players in all selected teams; and when the total number of players in all selected teams is equal to the preset number, allocate all selected teams to the same battle camp.

5. The computer gaming system according to claim 4, wherein the server is further configured to:

record an accumulated number of times for obtaining the total number of players in all selected teams;

when the accumulated number of times is greater than or equal to a preset threshold, terminate the method for team battle matching; and update the registered teams that participate in the team battle.

6. The computer gaming system according to claim 5, wherein the server is further configured to:

sort the teams of each matching queue according to the time the teams registered, from the earliest to the latest; and when selecting a team from each queue, select a team with an earliest registration from the queue.

\* \* \* \* \*